US005687667A

United States Patent [19]
Barron

[11] Patent Number: 5,687,667
[45] Date of Patent: Nov. 18, 1997

[54] TOWED ARRAY ACOUSTIC PROJECTOR SHADING DEVICE

[75] Inventor: Thomas D. Barron, Portsmouth, R.I.

[73] Assignee: The United States of America as represented by the Secretary of the Navy, Washington, D.C.

[21] Appl. No.: 682,900

[22] Filed: Jun. 17, 1996

[51] Int. Cl.$^6$ .................................................. F15D 1/10
[52] U.S. Cl. .................................................. 114/243
[58] Field of Search .................................. 114/243, 244, 114/242, 253; 385/102, 103, 104, 107; 174/105 R, 115, 126.2, 131 R, 120 R, 117 R, 119 R

[56] References Cited

U.S. PATENT DOCUMENTS

| | | | |
|---|---|---|---|
| 5,367,971 | 11/1994 | Carpenter et al. | 114/243 |
| 5,406,903 | 4/1995 | Clark | 114/243 |

*Primary Examiner*—Stephen Avila
*Attorney, Agent, or Firm*—Michael J. McGowan; Robert W. Gauthier; Prithvi C. Lall

[57] ABSTRACT

A device for acoustically shading selected portions of the projected acoustic signal from an omnidirectional transducer array being towed through a fluid. The device consists of an acoustically transparent, cylindrical outer covering attached to the transducer array by means of bearing assemblies. The bearing assemblies allow the device to freely rotate about the array. Sound absorbing material is placed on the interior side of the covering along a top portion and a bottom portion of the circumference. The bottom portion is weighted so as to maintain the orientation of the device with respect to the surrounding fluid as the array twists or rotates. The sound absorbing material prevents or shades the acoustic signals projected from the array from striking and being reflected from the fluid surface and the bottom layer of the environment. The cylindrical shape of the device fits easily over existing circular shaped towed arrays and also minimizes hydrodynamic drag as the array is towed through the fluid.

10 Claims, 1 Drawing Sheet

TOWED ARRAY ACOUSTIC PROJECTOR SHADING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to towed underwater cables and more particularly to a mechanical device for shading a portion of the acoustic signal emanating from a towed acoustic array cable.

2. Description of the Prior Art

In seismic imaging and other similar operations in an ocean environment, sonar devices or acoustic projectors are generally towed in an array behind a towing platform, or ship, over or through an area to be imaged. One such operation includes towing an array of acoustic projectors used in mobile target testing. The target array sends out signals having a known acoustic signature. In testing and calibrating these target arrays, a receiver compares the actual acoustic signals received from the target with the acoustic signature. The acoustic projectors of these target arrays are omnidirectional. In a shallow water environment, reflections of the acoustic signal from the surface and bottom interfere with testing and calibration. To minimize the effects of reflections, some form of acoustic shading is required to limit the projected acoustic signal to a generally horizontal plane. Multi-element projectors have been looked at in the past, but their application to targets requires projector redesign. Further, since towed arrays twist while being towed, the target array would have to incorporate an electronic sensor and associated circuitry in determining which elements to have active at any one time. The additional sensor and circuitry as well as the redesign adds unnecessary cost and complexity to the target arrays. Fixed mechanical shading is also impractical due to the twisting of the array. Various cable cross-sections have been developed to prevent cable twisting, such as the dual keel fin cable in U.S. Pat. No. 5,406,903 to Clark. Mechanical shading could be adapted to these cables, however, the cables are difficult to reel and store because of their shape. The use of these stabilized cross-section cables would require replacement of existing target array cables, as well as requiring larger reel stowage areas on the towing platform, or ship. There exists a need for a simple mechanical shading device which can be used on existing, circular cross section towed array cables and which is not affected by the twisting of the cable.

SUMMARY OF THE INVENTION

Accordingly, it is an object of the present invention to provide a low cost target array shading device to minimize acoustic signal reflections from the water surface and sea bottom.

It is another object of the present invention to provide a mechanical shading device which is not affected by twisting of the towed array.

It is a further object of the present invention to provide a mechanical shading device which can be used on present target array cables having a circular cross-section.

These and other objects of the invention are realized by providing a cylindrical device which fits over a target array. The device has a bearing assembly at each end which are attached to the array. The bearings permit the device to rotate freely around the projector array. The device is fabricated of a smooth, acoustically transparent material. The interior of the top and bottom portions of the device are coated with a sound absorbing material to prevent the projected acoustic signal from traveling to and being reflected by the surface or bottom. In addition, the bottom portion is weighted such that the device maintains its orientation when the towed array twists.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
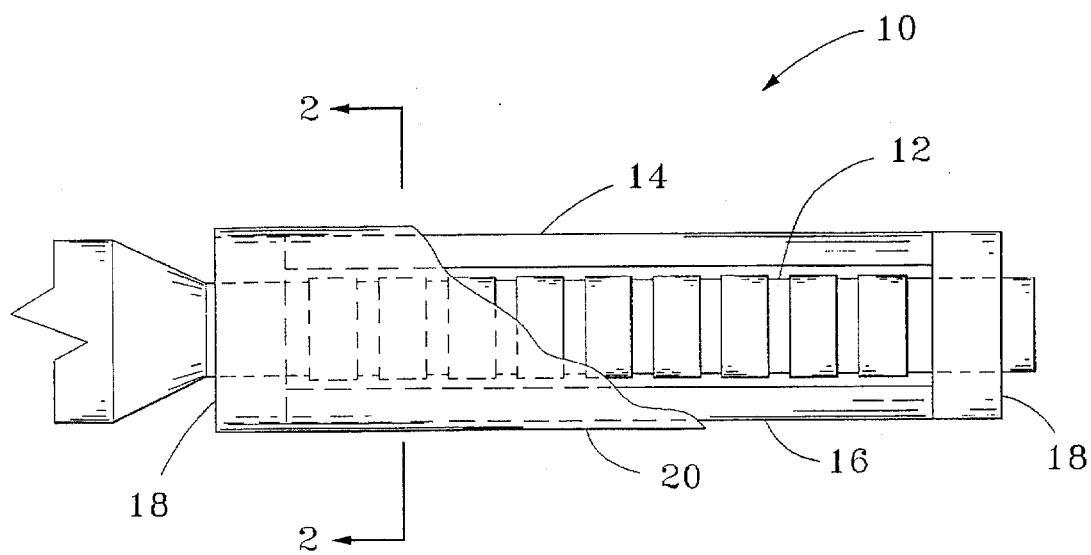
FIG. 1 is a side view of the shading device mounted on a transducer array.
Figure 2:
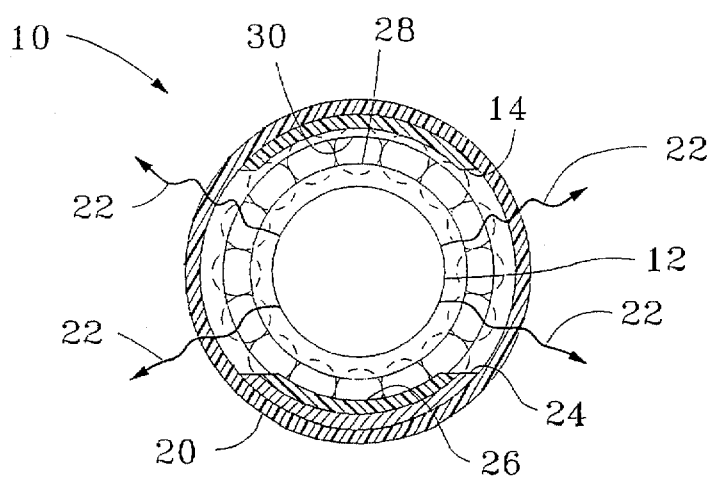
FIG. 2 is a sectional view taken at line 2—2 of FIG. 1.

Referring now to FIG. 1, there is shown a side view of a shading device 10 according to the present invention. Shading device 10 is shown attached to transducer array 12. Shading device 10 has top portion 14 and bottom portion 16 which are formed of sound absorbing material such as a rubberized foam. Such sound absorbing material is typically positively buoyant. Shading device 10 is attached to transducer array 12 by bearing assemblies 18 located at each end of shading device 10. Referring now additionally to FIG. 2, there is shown a cross section of shading device 10 taken at line 2—2 of FIG. 1. Shading device 10 has an outer enclosure 20 which forms a cylindrical shell about transducer array 12 and top and bottom portions 14 and 16. A portion of outer enclosure 20 is shown removed in FIG. 1 for increased clarity. Enclosure 20 is acoustically transparent. Sound propogating from transducer array 12, indicated by arrows 22, passes through enclosure 20, but is absorbed or shaded by top and bottom portions 14 and 16. Bottom portion 16 has a weighted layer 24 in addition to sound absorbing material layer 26. The inner raceway 28 of bearing assembly 18 is attached to transducer array 12 while the outer raceway 30 is attached to enclosure 20. In general, bearing assembly 18 is affixed to enclosure 20 during fabrication of shading device 10. Inner raceway 28 would have an inner diameter slightly larger than the outer diameter of array 12. Shading device 10 would be slipped over array 12 and then secured to array 12 by any suitable means, such as set screws or clamps. Bearing assemblies 18 allow free rotation of shading device 10 about transducer array 12. In combination with the weight of bottom portion 16 and the buoyancy of top portion 14, bearing assemblies 18 allow shading device 10 to maintain the orientation indicated as the transducer array twists or rotates.

What has thus been described is a device for acoustically shading selected portions of the projected acoustic signal from an omnidirectional transducer array. The device consists of an acoustically transparent, cylindrical outer covering attached to the transducer array by means of bearing assemblies. The outer raceway of the bearing assembly is fixed to the cylindrical outer covering and the inner raceway of the bearing assembly is attached to the array. This allows the device to freely rotate about the array. The outer covering is weighted so as to maintain its orientation with respect to the surrounding fluid as the array twists or rotates. In the preferred embodiment for use in shallow water, sound absorbing material is placed on the interior side of the covering along a top portion and a bottom portion of the circumference. The sound absorbing material prevents or shades the acoustic signals projected from the array from striking and being reflected from the fluid surface and bottom layer of the environment. The cylindrical shape of the device fits easily over existing circular shaped towed arrays and also minimizes hydrodynamic drag as the assembly is towed through the fluid.

Obviously, many modifications and Variations of the present invention may become apparent in light of the above teachings. For example, the shape and orientation of the sound absorbing portions can be changed to suit the testing requirements. Various shapes of transducer arrays can be accommodated by changing the shape of the inner raceway where it attaches to the array. Various materials may be used for the outer covering, sound absorbing material and weighted layer. For example, the sound absorbing material may be similar to that used in quieting submarines. The weighted layer can be brass or lead, but preferably is tungsten since tungsten is heavier than lead and is more environmentally friendly. The device could also be adapted for use in shading electromagnetic signals, such as optical or radio signals, by changing the sound absorbing material to a material suitable for absorbing the electromagnetic signal of interest.

It is therefore to be understood that within the scope of the appended claims, the invention may be practiced otherwise than as specifically described.

What is claimed is:

1. A signal shading device for selectively shading at least one portion of a signal emanating from a source, the shading device comprising:

an outer covering surrounding the source, the outer cover being transparent to the signal;

at least one attachment assembly for rotatably securing the shading device to the source;

at least one signal absorbing area affixed to the outer covering; and at least one weighted area affixed to the outer covering, the weighted area creating a righting moment to maintain the shading device in a relatively fixed orientation with respect to a medium surrounding the shading device.

2. The shading device according to claim 1, wherein the at least one attachment assembly comprises:

an inner raceway secured to the source;

an outer raceway secured to the outer covering; and bearings contained between the inner and outer raceways, the bearings allowing rotation of the outer raceway about the inner raceway.

3. The shading device according to claim 1, wherein the outer covering forms a cylinder.

4. The shading device according to claim 2, wherein the outer covering forms a cylinder, the inner and outer raceways having a circular shape.

5. The shading device according to claim 1, wherein the at least one signal absorbing area and the at least one weighted area are co-located on the outer covering.

6. The shading device according to claim 1, wherein the at least one signal absorbing area is positively buoyant.

7. The shading device according to claim 1, wherein the at least one weighted area comprises a layer of tungsten.

8. The shading device according to claim 1, wherein the at least one signal absorbing area comprises a rubberized foam suitable for absorbing acoustic signals.

9. The shading device according to claim 7, wherein the at least one signal absorbing area comprises a rubberized foam suitable for absorbing acoustic signals.

10. The shading device according to claim 9, wherein the at least one signal absorbing area and the at least one weighted area are co-located on the outer covering.

* * * * *